United States Patent [19]

Smith

[11] 4,344,576
[45] Aug. 17, 1982

[54] TRICKLE FLOW IRRIGATION VALVE

[76] Inventor: Allan L. Smith, 26591 Rd. 196, Exeter, Calif. 93221

[21] Appl. No.: 187,057

[22] Filed: Sep. 15, 1980

[51] Int. Cl.³ .............................................. B05B 15/00
[52] U.S. Cl. ..................................... 239/542; 239/570
[58] Field of Search ............... 239/107, 109, 534, 535, 239/542, 570; 137/218

[56] References Cited

U.S. PATENT DOCUMENTS

| | | | |
|---|---|---|---|
| 2,554,790 | 5/1951 | Miller | 239/533.13 X |
| 3,693,888 | 9/1972 | Rondas et al. | 239/547 X |
| 3,873,031 | 3/1975 | Reeder et al. | 239/542 |
| 3,908,694 | 9/1975 | Spears | 239/542 X |
| 3,954,223 | 5/1976 | Wichman et al. | 239/109 |
| 4,161,291 | 7/1979 | Bentley | 239/542 |

Primary Examiner—Robert B. Reeves
Assistant Examiner—Gene A. Church
Attorney, Agent, or Firm—Huebner & Worrel

[57] ABSTRACT

An emitter of very small size connects to a water supply tube by a hollow shank which conducts water to an interior chamber in the emitter housing. Between the chamber and an outlet in the housing the water flow is throttled through an elongated channel having both a wide shallow profile and a narrow steep profile. A free floating (within limits) resilient wafer covers the channel. At initial, very low water pressure at start-up, the wafer does not flex into the channel, thereby affording maximum flow to purge the emitter of unwanted dirt particles and the like. At relatively low operating pressure the wafer flexes into the wide shallow portion of the channel, reducing the flow to a predetermined amount, such as one gallon per hour. At relatively high pressure the wafer flexes further, intruding into the narrow steep slot, thereby compensating for the increased pressure and maintaining fluid flow at said predetermined rate. The free-floating wafer affords quick, thorough flushing and avoids build-up of unwanted foreign matter in the emitter.

5 Claims, 8 Drawing Figures

TRICKLE FLOW IRRIGATION VALVE

BACKGROUND OF THE INVENTION

The invention relates generally to valves, or emitters, of the type used to apply water to vegetation at relatively low rates of flow; and, more particularly, to pressure compensating emitters which automatically compensate for varying pressures in the water supply system so that the amount of water emitted remains substantially constant despite fluctuations in the supply water pressure.

Investigation has revealed the following U.S. patents as being of interest in the present field: Wichman et al. U.S. Pat. No. 3,954,223; Rondas et al. U.S. Pat. No. 3,693,888; Miller U.S. Pat. No. 2,554,790; Reeder et al. U.S. Pat. No. 3,873,031; and Spears U.S. Pat. No. 3,908,694.

Although possessing some features which are similar to those appearing in the prior art disclosures, applicant's emitter provides a number of other features which are new and different and afford distinct advantages.

SUMMARY OF THE INVENTION

A housing includes an internal chamber defined by walls provided with an inlet port adjacent one end and an outlet port adjacent the other end, the inlet port being in communication with a water supply tube through a conduit penetrating the supply tube wall.

A resilient wafer is free to move toward the end wall having the outlet port. On the inner surface of the outlet end wall is formed a channel of predetermined cross-section. In response to increased inlet pressure, the resilient wafer flexes into the channel, thereby decreasing the cross-sectional area of the channel and increasing the frictional resistance to flow. The channel geometry and the flexure properties of the wafer are so arranged that the quantity of flow through the outlet port remains substantially constant regardless of pressure fluctuations in the water supply system.

The free-floating characteristic of the resilient wafer not only effects economies in production and ease of assembly but also better flushing at start-up and more reliable seating.

BRIEF DESCRIPTION OF THE DRAWING FIGURES

DESCRIPTION OF THE PREFERRED EMBODIMENTS

Figure 1:
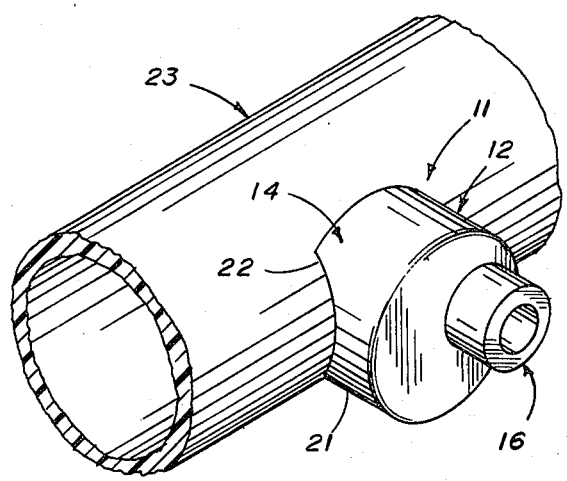
FIG. 1 is a perspective view, approximately three times actual size, of one preferred embodiment of the emitter of the present invention installed on a water supply tube.
Figure 2:
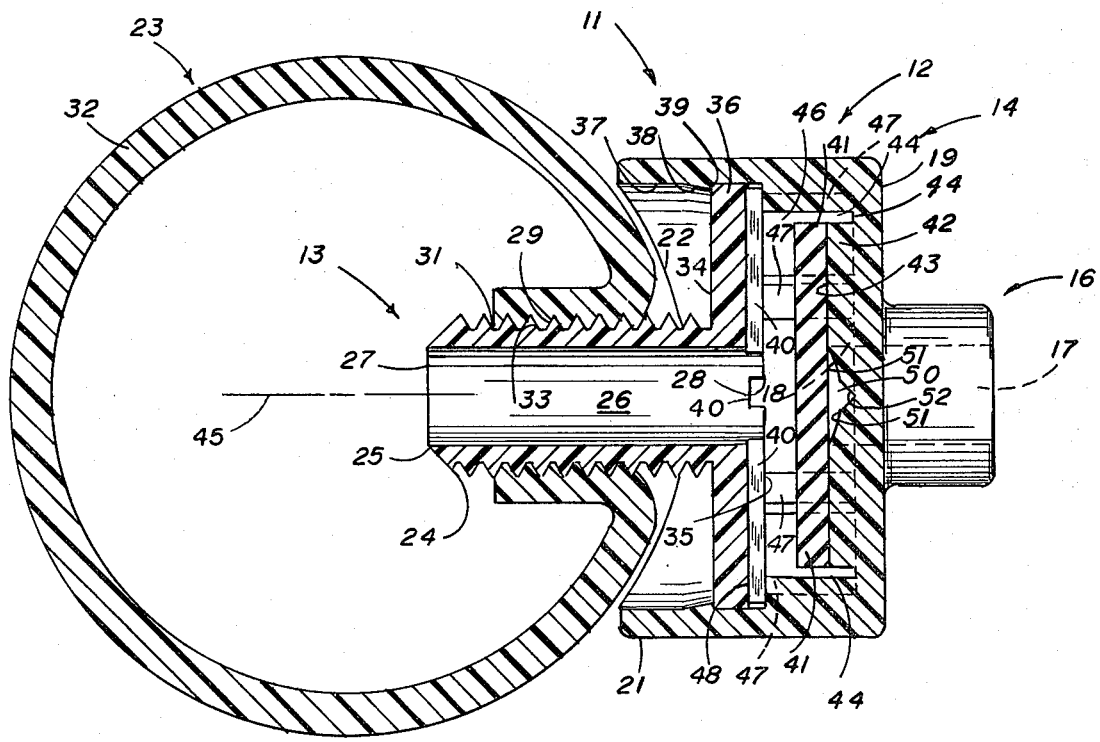
FIG. 2 is a median sectional view of the emitter of FIG. 1 to an enlarged scale, showing the elastomeric wafer under conditions of very low or non-existent water pressure.

One preferred embodiment of the emitter of the invention, generally designated by the reference numeral 11, comprises a housing 12 including a base 13 and a cap 14 to which the base 13 is affixed by a snap fit as shown most clearly in FIG. 2, or by an adhesive, or other means, such as threads or welding.

An asymmetrically located spout 16 having a central passageway 17 in communication with an opening 18 in the end wall 19 of the cap 14 emits water at a low rate of flow onto adjacent vegetation. The spout 16 is not ordinarily necessary where the trickle of water emerging from the opening 18 is properly located relative to the vegetation. Where the trickle must be directed to a location removed from the emitter, however, the spout 16 provides a convenient fitting for a tube extending from the emitter to the desired location relative to the vegetation.

In the actual device, the diameter of the spout passageway 17 is on the order of 1.50 mm; and under either relatively low water supply pressure (for example, 15 p.s.i.) or relatively high pressure (for example 50 p.s.i.) only about one gallon or so of water per hour is emitted.

This capability of emitting substantially an identical trickle or very low quantity of water under either high or low supply pressure is highly advantageous in numerous field conditions.

For example, this characteristic enables the device to be used in irrigating vegetation in hilly country which would otherwise not be useful for the production of food or fiber. Avocado, citrus, almond, pistachio, kiwi, figs, olives, or other trees having comparable high value crop yields, as well as peaches, apples etc can be grown on hillsides with similar flows being assured at all locations. By using the present emitter, substantially the same amount of water will reach the roots of a tree at the bottom of a hill, where the pressure in the water supply tube may be on the order of 50 p.s.i., as will reach the roots of a tree perhaps eighty feet or so higher on a hill where the pressure in the supply tube is on the order of 15 p.s.i. The amount of water emitted at either location will be about one or two gallons of water per hour.

Mounted on the end wall 19 of the cap 14 and extending from the margin of the end wall in a direction away from the spout 16 is a skirt 21. Preferably, the end of the skirt 21 is suitably contoured, as at 22, in order to conform closely to the geometry of the water supply tube 23. This construction minimizes the extent to which the emitter projects and thus reduces the likelihood of damage resulting from being snagged and pulled out of the tube.

The base 13 is attached to the water supply tube 23 by an elongated hollow shank 24, or stem, having a central passageway 26 extending from an inlet opening 27 to an outlet opening 28.

Heretofore, conventional emitters have utilized a single barb shaped shank somewhat resembling an arrow head having a rather pointed tip, a single enlarged shoulder portion and a reduced neck. These prior art barbs have been forced, pointed end first, into a small hole created in the supply tube walls. Sufficient force is applied so as to open the hole in the somewhat flexible tube walls and urge the barb into the interior of the tube. Once lodged, the shoulders on the single barb engage the interior wall of the tube and thus preclude withdrawal. The difficulty with the single barb type of anchor heretofore utilized, however, is that a relatively long shank is needed to ensure that the barb goes completely through the tube wall. The emitter is not held snugly against the tube and thus can be snagged and pulled loose more easily.

In order to eliminate the snugness problem, the shank 24, or stem, in the FIG. 2 form of device is exteriorly threaded, as at 29. By using a threaded shank, such as most clearly appears in FIG. 2, a shorter shank can be used. When the tip 25 of the threaded shank 24 is pushed into the hole 31, the tube wall 32 recurves somewhat, as shown in FIG. 2, and the exterior surface 33 of the tube wall 32 also recurves and tightly envelops several teeth 29, thereby forming a most effective water seal and firmly positioning the emitter so that subsequent accidental blows are absorbed by the emitter without being disposed from the tube or resulting in leakage. The teeth 33 tend to cut into the tube walls, providing additional sealing and holding power.

The shank 24, as previously mentioned, is secured to the cap 14 either by a snap fit or by welding, threading or any other suitable means.

In the embodiment illustrated, an annular flange 36 on the end of the shank 24 opposite the tip 25 is in a snap fit relation with the cap 14, the inner wall 37 of the skirt 21 having an annular sloping protuberance 38 terminating in an annular shoulder 39 (see FIG. 2). The "plastic" material of the cap 14 and the base flange 36 is slightly yieldable so that as the flange 36 is forced into the cap 14, the protuberance 38 and the flange 36 mutually give way an amount sufficient to allow the flange 36 to pass beyond and behind the annular shoulder 39 as clearly appears in FIG. 2.

The perimeter of the after flange surface 34 engages the annular shoulder 39 and the perimeter of the forward flange surface 35 abuts the ledges 48 of a plurality of longitudinal ribs 47.

A pair of channels 40 which cross at right angles connects the outlet opening 28 with the perimeter of the central chamber 46 regardless of the position of a floating wafer 41. In other words, water emerging from the passageway 26 will flow radially outwardly to the perimeter of the chamber 46 even though the wafer 41 abuts the flange surface 35.

Prior to joining the base 13 to the cap 14, the wafer 41, of elastomeric material having a carefully predetermined resiliency and thickness, is inserted into the cap 14. In the embodiment of FIGS. 1–6, the wafer 41 is a circular disc.

The wafer 41 is substantially the same diameter as a pedestal 42 projecting from the inner side of the end wall 19. In fact, the planar surface 43 of the pedestal 42 in face-to-face relation with the disc 41 can be considered as the inner surface of the end wall 19, the inner surface of the end wall 19 being formed with a substantially circular gutter 44, or trough, which delineates the periphery of the pedestal 42.

The disc 41 customarily remains in engagement with the pedestal 42 when there is water under any pressure within the chamber 46 defined by the pedestal surface 43, the base flange 36 and the inner surface 37 of the encompassing walls of the skirt 21, the pressure of the water tending to urge the disc 41 toward the opening 18 in the end wall 19 leading to the spout passageway 17.

The diameter of the chamber 46 is substantially identical with the diameter of the flange 36. The chamber 46 and the peripheral gutter 44, are interrupted, however, by a plurality of longitudinal ribs 47 (six in number in the present embodiment) which serve loosely to confine the disc 41 by limiting the disc against excessive transverse movement. The ribs 47, as previously explained, terminate in ledges 48, or shoulders, facing toward the base flange 36, the ledges 48 serving, in conjunction with the protuberance 38, to confine the base flange 36 (see FIG. 2).

In order to limit the quantity of water flowing through the emitter 11 and to regulate the flow so that the output is substantially constant over a wide range of system pressures, a channel 50 having unique contours is formed in the inner surface 43 of the end wall 19.

The channel 50 extends transversely relative to the axis of the passageway 26, the channel 50 straddling the diameter of the pedestal 42 which bisects the longitudinal axis of the spout 16. Water moving through the channel 50 discharges into the opening 18 in the end wall 19 thence through the spout passageway 17 to emerge from the spout and drop to the ground in the desired location.

Figure 4:
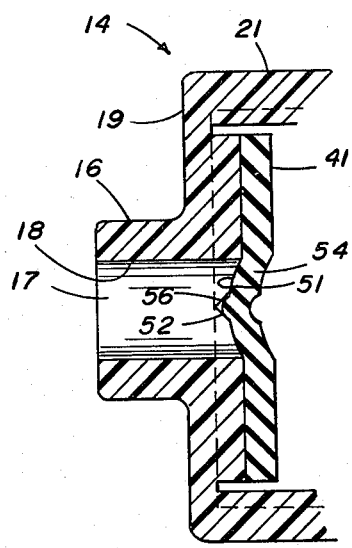
FIG. 4 is a fragmentary sectional view, similar to FIG. 3, but showing the extent of wafer flexure under relatively high water pressure.
Figure 3:
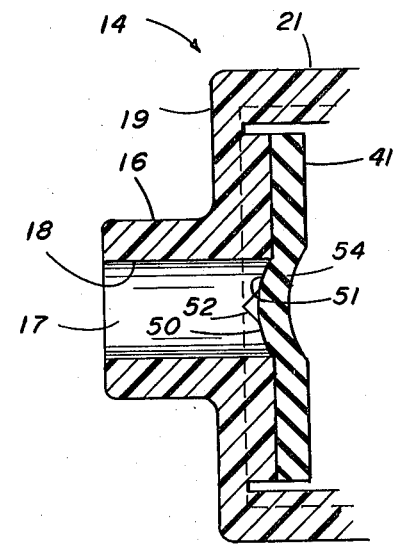
FIG. 3 is a fragmentary sectional view showing the extent of wafer flexure under relatively low water pressure, the compound planes of the section being indicated by the lines 3—3 in FIG. 5.

As appears most clearly in FIGS. 2, 3 and 4, the particular channel 50 disposed herein comprises a profile of two different shapes. The profile adjacent the resilient disc 41 is wide and shallow. This wide and shallow portion of the channel 50 is designated by the reference numeral 51 and is conveniently termed a flush slot, or flush groove. In contrast is the central, deep and narrow portion of the channel, designated by the reference numeral 52, and sometimes referred to as a flow slot, or flow groove.

The flush groove 51 is wide and shallow so that the rubber disc 41 will be depressed into the groove 51 at a very low pressure. The flow slot 52, on the other hand, is relatively deeper and narrower so that the amount of change of cross-sectional area as a function of the extent of change of water pressure is diminished.

Figure 5:
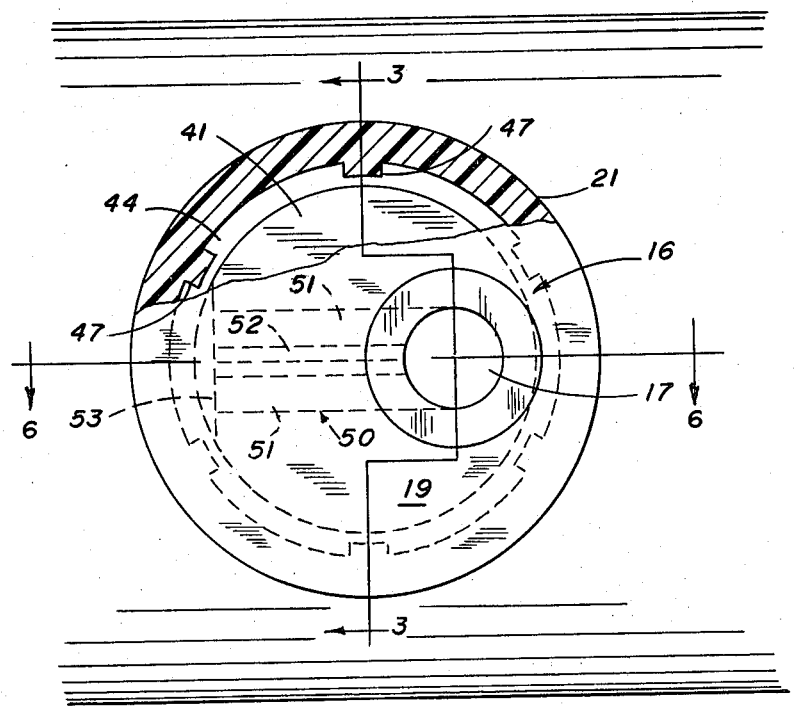
FIG. 5 is a view taken from the right-hand side in FIG. 2, with portions broken away to reveal interior details.
Figure 6:
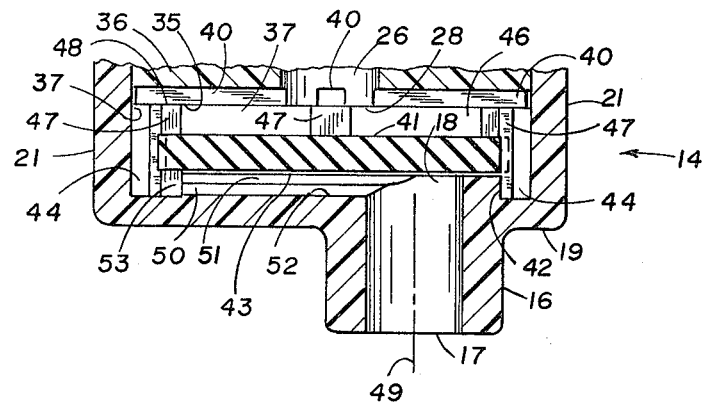
FIG. 6 is a fragmentary sectional view, taken on the line 6—6 in FIG. 5.

In order to facilitate the entry of water from the chamber 46 into the channel 50, and to maintain a constant channel length, a portion of the pedestal 42 adjacent the channel entrance is removed to form a bay 53 (see FIGS. 5 and 6). With particular reference to FIG. 6, it can be seen that even though the wafer 41 shifts from the extreme left-hand position shown in full line to the extreme right-hand position shown in broken line, the effective "covered" length of the channel 50 remains the same.

When the water system is started up, it is desirable to purge the emitter of any residual unwanted material, such as particles of dirt. In the present device, this flushing action occurs automatically at system startup, when water pressure is very low, as will now be explained.

Where a very low water pressure is present, as at startup, the resilient disc 41, being free, within limits, to "float", may be located at any random position within the chamber 46. Even if the disc engages the surface 43 of the pedestal, it does not flex into the channel 50. Instead, the disc 41 remains substantially flat, as appears in FIGS. 2 and 6. Thus, the maximum channel profile area is available for the transmission of water from the main supply tube 23, through the shank passageway 26 into the chamber 46, thence around the gutter 44, into the bay 53 and through the channel 50 into the discharge passageway 17. Only a very short time, on the order of a few seconds, is required to flush the emitter.

As the system fills with water, the pressure within the emitter will rise to a predetermined level, so that the emitter at the point of lowest pressure is discharging in the required quantity, operating, perhaps, at a low pressure on the order of 15 p.s.i., which provides about one gallon per hour.

The emitters elsewhere in the system will often be at a considerably higher pressure, owing to the effect of pipe friction and elevation differences.

Even though the pressure elsewhere in the system may be quite high, however, for example, on the order of 50 p.s.i., the discharge rate is substantially the same, namely, on the order of one gallon per hour.

The reason for this self compensating feature is illustrated most clearly in FIGS. 3 and 4.

Under low operating pressure, e.g. 15 p.s.i., (as opposed to very low flush pressure) the resilient disc 41 is flexed downwardly, as at 54, (see FIG. 3), into the wide shallow portion 51, or flush groove portion, of the elongated channel 50, thus permitting flow from the chamber 46 to the spout 16 only through the flow slot portion 52 of the channel 50.

At about 15 p.s.i. the length of the channel and the cross-sectional area of the flow slot portion 52, together with the friction factor results in an emission of about one gallon per hour.

Where the chamber pressure is in the vicinity of 50 p.s.i. it would ordinarily follow that water flow would increase. However, in the present device, the increase in pressure results in a secondary flexure of the disc wherein the central portion 56 (see FIG. 4) of the previously flexed zone 54 is flexed further downwardly into the flow slot portion 52. This reduces the cross-sectional area of the flow slot 52 and thus not only reduces the areal flow capacity but also increases the pipe friction factor and thereby diminishes the flow so that as a result, only about one gallon per hour is emitted from the spout 16 even at relatively high pressure.

In addition to the pressure compensating feature, as recited above, the present device has at least two other characteristics which mark a distinct advance in the emitter art.

One is that the resilient wafer 41 is free floating, within limits, in all directions. That is to say, it can move axially between the flange 36 and the pedestal 42 and transversely within the area defined by the ribs 47. This freedom of motion allows particles anywhere on or around the surface of the wafer 41 to be flushed away immediately as start-up takes place.

In some prior art devices, the wafer is affixed or constrained at some portion of its length, thereby enabling foreign matter to become trapped under the wafer, with the result that the wafer can be held away from an adjacent channel, thus impairing the wafer's efficiency and even its ability to operate at all in course of time.

Another advantage flowing from the construction and operation of the present device is that the length of the channel 50 is constant, as previously explained, even though the wafer is free to shift transversely (within the constraints provided by the ribs 47) as well as fore and aft and thus afford a most beneficial flushing capability. The constant length feature assures that the channel 50 is never uncovered for any portion of its length. Thus, the "covered" channel length is never "shortened", which would result in an unwanted increase in flow.

In summary, the excellent flushing qualities of the present emitter do not in any way impair its highly desirable pressure regulating capabilities.

Figure 7:
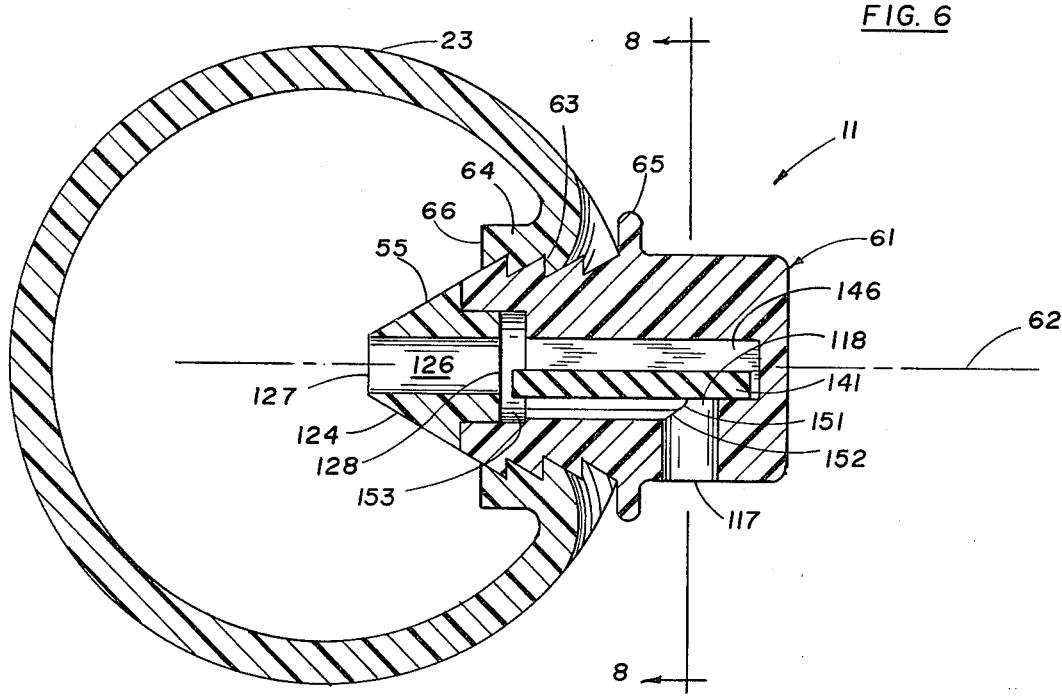
FIG. 7 is a median sectional view, to an enlarged scale, of another preferred embodiment; and, FIG. 8 is a section taken on the line 8—8 in FIG. 7.
Figure 8:
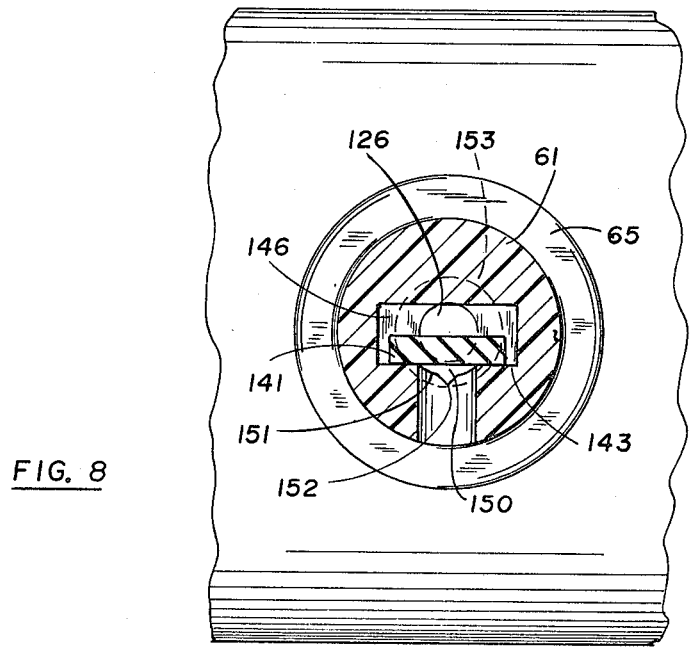

Another preferred embodiment is illustrated in FIGS. 7 and 8 in which elements common to both embodiments are designated by the same reference numerals.

As in the previously described embodiment shown in FIGS. 1-6, water is provided by the system supply tube 23. In the form of device shown in FIGS. 7 and 8, however, the emitter of the invention 11, comprises a compact, fore and aft elongated body 61 substantially symmetrical about a longitudinal, fore and aft axis 62.

The end of the body 61 facing toward the supply tube 23 is formed with a plurality of (here three) barbs 63 in tight engagement with the inturned portion 64 of the tube 23. As before, a pilot opening 66 is formed in the tube 23 at the desired location and the barbs are pushed forcibly into the opening, recurving the surrounding portion of the tube wall as the barbs advance, and lodge in the somewhat resilient tube wall material, as shown. A flange 65 serves as a limit stop.

Entry of the barbs 63 is facilitated by an arrowhead-shaped shank 124 having a central axial passageway 126 extending from an inlet opening 127 to an outlet opening 128 in communication with a bay 153.

The bay 153, in turn, is in communication with a longitudinal channel 150 having, as before, two profiles, a wide shallow contour portion 151 into which the adjacent surface of an elongated fore and aft resilient wafer 141 projects at relatively low operating pressure, and a narrow, steep contour portion 152 into which the resilient member 141 further projects at relatively high operating pressure.

As can readily be seen, the form of emitter shown in FIGS. 7 and 8 marks a considerable simplification over the embodiment illustrated in FIGS. 1-6. Yet, as before, the elongated, rectangular wafer 141 is free to float, within limited constraints, in the chamber 146, so that at start-up the wafer may be located at a distance from the surface 143, thereby permitting a rapid flushing action to occur. And, again, even if the wafer 141 were to be in engagement with the surface 143 at start-up, the wafer 141 would not be in flexed condition because of the very low pressure at start-up. As a consequence, water can readily flow through the channel 150 and effect flushing.

In further likeness to the FIGS. 1-6 embodiment, the length of the channel 150 remains constant because the wafer 141, although free to move to and fro within the chamber 146 can never shift to a location in which the channel length is ever curtailed.

Thus, both embodiments not only provide substantially constant flow, but free flushing capabilities and freedom from build-up of foreign matter under the wafer which would tend to lift the wafer from the channel and eventually render the emitter inoperative. At the same time, these advantageous results are achieved in an emitter which is compact in size, economical to manufacture and reliably easy to install.

I claim:

1. A pressure compensating emitter for fluid comprising a housing having inlet and outlet ports communicating with a pressurizable internal chamber having a predetermined dimension, a wall containing said outlet port facing said chamber and having a channel therein interconnecting the outlet port and the periphery of the wall at an entrance for the channel and being of a shorter length than said predetermined dimension of the chamber; and an unattached flexible wafer within said chamber having a corresponding dimension less than said predetermined dimension of the chamber and sufficiently greater than the length of the channel to be movable within the chamber in response to fluid pressure to free the emitter of foreign substances while overlaying said channel and outlet port in all positions when the chamber is pressurized to define with said channel a passage for fluid to the outlet port of constant length.

2. The emitter of claim 1 wherein the housing has a well adjacent to the entrance of the channel and in communication therewith and being of sufficient size to permit the wafer to flex therewithin substantially without obstructing said entrance of the channel.

3. The emitter of claim 2 wherein said wall of the housing has an annular groove facing the chamber, extending about the outlet port and channel and communicating with the well to establish a path for fluid flow about the periphery of the wafer and along the groove into the well.

4. A pressure compensating emitter for fluid comprising:
 a. a substantially flat disc of flexible material having a substantially circular peripheral edge and a predetermined diameter; and
 b. a pressurizable fluid housing having inlet and outlet ports, an end wall having a substantially flat substantially circular pedestal bounded by an annular groove with said outlet port extending through the pedestal and a channel having a length less than said predetermined diameter of said disc extending to the outlet port from the periphery of the pedestal, and a side wall bounding the annular groove of the pedestal to define a pressurizable fluid chamber enclosing the disc therein so that said disc overlays the pedestal, said chamber having a dimension corresponding to but sufficiently larger than said predetermined diameter of the disc to permit limited movement of the disc across the pedestal without uncovering the channel and outlet port thereof whereby said disc and channel define a fluid passage to the outlet port of constant length while permitting such limited movement of the disc for flushing foreign substances from the emitter through the outlet port.

5. A pressure compensating emitter for fluid comprising a housing having an inlet and an outlet communicating with a pressurizable internal chamber having a predetermined dimension, a wall containing said outlet facing the chamber and having a channel therein interconnecting the outlet and the periphery of the wall at an entrance for the channel and being of a shorter length than said predetermined dimension of the chamber; and an unattached flexible wafer within said chamber having a corresponding dimension less than said predetermined dimension of the chamber and sufficiently greater than the length of the channel to be movable within the chamber in response to fluid pressure to free the emitter of foreign substances while overlaying said channel and outlet in all positions when the chamber is pressurized to define with said channel a passage for fluid to the outlet of constant length.

* * * * *

UNITED STATES PATENT AND TRADEMARK OFFICE
CERTIFICATE OF CORRECTION

PATENT NO. : 4,344,576
DATED : August 17, 1982
INVENTOR(S) : Allan L. Smith

It is certified that error appears in the above-identified patent and that said Letters Patent are hereby corrected as shown below:

On the Title Page, identified at [54], delete "TRICKLE

FLOW IRRIGATION VALVE" and substitute ---DRIP IRRIGATION

PRESSURE COMPENSATING EMITTER";

Column 1, Line 1, delete "TRICKLE FLOW IRRIGATION VALVE", and substitute ---DRIP IRRIGATION PRESSURE COMPENSATING

EMITTER---;

Column 3, Line 23, delete "disposed" and insert

---dislodged---;

Column 4, Line 28, delete "disposed" and insert

---disclosed---; and

Column 6, Line 36, delete "Figs. 1-6" and insert

---Figs. 1-8---.

Signed and Sealed this

Seventh Day of December 1982

[SEAL]

Attest:

GERALD J. MOSSINGHOFF

Attesting Officer     Commissioner of Patents and Trademarks